(12) United States Patent
Sparrow et al.

(10) Patent No.: US 6,885,333 B2
(45) Date of Patent: Apr. 26, 2005

(54) CROSS-EYE TECHNIQUE IMPLEMENTATION

(75) Inventors: Mitchell J. Sparrow, Wayne, NJ (US); Joseph Cikalo, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/780,141

(22) Filed: Feb. 17, 2004

(65) Prior Publication Data

US 2005/0001754 A1 Jan. 6, 2005

Related U.S. Application Data

(63) Continuation of application No. 10/242,268, filed on Sep. 12, 2002, now abandoned, which is a continuation-in-part of application No. 10/052,522, filed on Jan. 23, 2002, now Pat. No. 6,545,630.

(51) Int. Cl.[7] .................................................. G01S 7/38
(52) U.S. Cl. ............................. 342/13; 342/14; 342/15
(58) Field of Search ............................... 342/13, 14, 15

(56) References Cited

U.S. PATENT DOCUMENTS

| | | | | | |
|---|---|---|---|---|---|
| 4,454,513 A | * | 6/1984 | Russell | ......................... | 342/174 |
| 5,200,753 A | * | 4/1993 | Janusas | ........................ | 342/14 |
| 5,506,582 A | * | 4/1996 | Lawsine | ....................... | 342/15 |
| RE35,553 E | | 7/1997 | Li | | |
| 6,252,559 B1 | * | 6/2001 | Donn | .................... | 343/781 CA |
| 6,297,762 B1 | * | 10/2001 | Labitt | .......................... | 342/14 |
| 6,556,002 B1 | | 4/2003 | Greenbaum et al. | | |

FOREIGN PATENT DOCUMENTS

| | | | | |
|---|---|---|---|---|
| FR | 2676125 | | 11/1992 | |
| FR | 2731802 | | 9/1996 | |
| FR | 2740557 A1 | * | 4/1997 | ............. G01S/7/38 |

OTHER PUBLICATIONS

"Anti–monopulse jamming techniques", Neri, F.;Microwave and Optoelectronics Conference, 2001. IMOC 2001.Proceedings of the 2001 SBMO/IEEE MTT–S International, vol.: 2 , Aug. 6–10, 2001 Ps:45–50.*

Tactical Technologies, Inc., Cross–Eye Jamming Effectiveness, Ottawa, Ontario, Canada.

* cited by examiner

Primary Examiner—John B. Sotomayor
(74) Attorney, Agent, or Firm—RatnerPrestia (57) ABSTRACT

An electronic warfare (EW) cross-eye system comprises two antennas separated a distance, d, a part, where d is much greater than the wavelength, $\lambda$, of a tracking signal emitted by a fire control radar (i.e., d>>$\lambda$). The EW cross-eye system further comprises a receive polarimeter for measuring the tracking signal and a second polarimeter for synthesizing the measured tracking signal to produce, for transmission, a jamming signal comprising a pair of inverted amplitude signals that are 180 degrees out of phase with each other.

13 Claims, 8 Drawing Sheets

CROSS-EYE TECHNIQUE IMPLEMENTATION

This application is a Continuation of application Ser. No. 10/242,268, filed Sep. 12, 2002, now abandoned which is a Continuation-in-part of application Ser. No. 10/052,522, filed Jan. 23, 2002, now U.S. Pat. No. 6,545,630.

BACKGROUND OF THE INVENTION

The invention relates generally to electronic warfare (EW) systems and, more particularly, to devices and techniques for jamming tracking radars.

Figure 1:
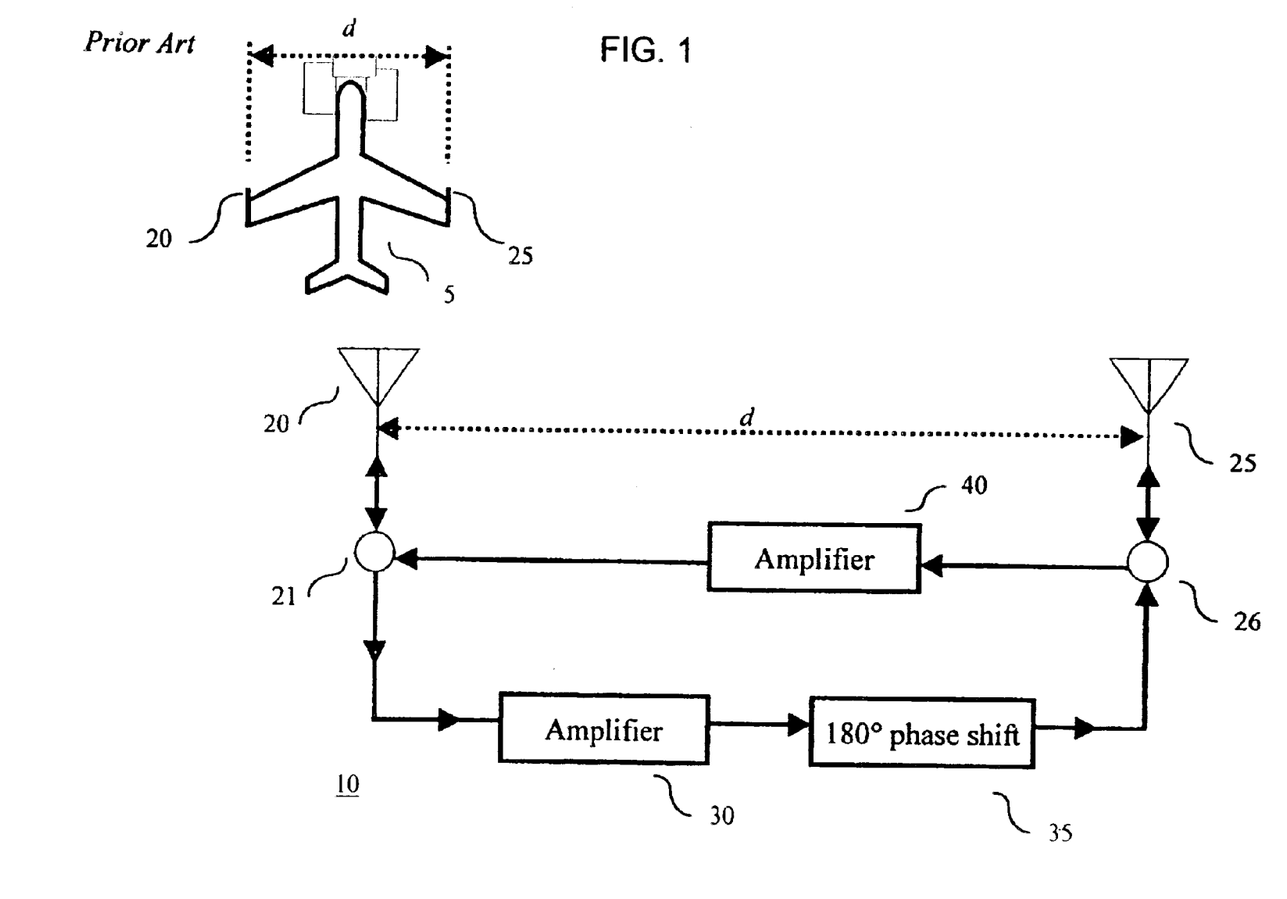
FIG. 1 illustrates a prior art EW cross-eye technique.

"Cross-eye" jamming is a known technique for masking an object or platform, e.g., an aircraft, from fire control radars. In a cross-eye system, a portion of the signal transmitted by a fire control radar—the threat signal—is received by the aircraft and is processed to form a jamming signal comprising a pair of inverted amplitude signals that have a phase relationship between them that is 180 degrees out of phase. The jamming signal is then transmitted back toward the radar antenna. When the pair of inverted amplitude signals arrive at the antenna of the fire control radar—the 180 degrees out of phase condition causes wavefront distortion, which further causes the fire control radar to re-align its antenna away from the aircraft. This type of cross-eye system 10 is illustrated in FIG. 1. (It should be noted that a cross-eye system can also be set up to perform as a "power match on transmit" system, where the amplitudes of the jamming signal pair are equal.)

Cross-eye system 10 is mounted within airplane 5. As illustrated in FIG. 1, two antennas (20 and 25) of cross-eye system 10 are placed on opposing wings of airplane 5 such that they are separated by a distance, d, where d is much greater than the associated wavelength, λ, of a fire control radar frequency of interest (i.e., d>>λ). In addition to antennas 20 and 25, cross-eye system 10 also comprises amplifiers 30 and 40, phase shifter 35, and circulators 21 and 26. In operation, each antenna receives the fire control radar signal, or threat signal. The received signal of antenna 20 is provided to amplifier 30, via circulator 21; while the received signal of antenna 25 is provided to amplifier 40, via circulator 26. The gain of amplifiers 30 and 40 are adjusted to produce inverted amplitude output signals. (For example, if antenna 20 receives a higher amplitude signal than antenna 25, then, on transmission, the output signal from amplifier 40 is now proportionally higher than the output signal from amplifier 30.) The output signal from amplifier 40 is provided to antenna 20, via circulator 21, for transmission; while the output signal from amplifier 30 is phased shifted 180° by phase shifter 35 and then provided to antenna 25, via circulator 26, for transmission. The resultant jamming signal has inverted amplitude components that are 180 degrees out of phase with each other. The jamming signal is transmitted in the direction of the fire control radar. When the jamming signal reaches the radar antenna, the resulting wavefront distortion (caused by the inverted amplitude components that are 180 degrees out of phase with each other) causes the fire control radar to attempt to track the jamming signal instead of the aircraft—thus masking the aircraft. The final result is that the jamming signal causes large tracking errors in the fire control radar with the result that any missile launched toward the aircraft is misguided.

In theory, as seen from the description above, cross-eye is a simple technique for providing protection to a platform from weapon systems employing radar guidance. Unfortunately—in practice—the performance of a cross-eye system is critically dependent upon how well the amplitude ratio and the out of phase condition of the jamming signal is controlled—especially in hostile environments where the platform is further subject to severe vibrations and temperature ranges.

SUMMARY OF THE INVENTION

We have observed that the implementation of a cross-eye system can be simplified in such a way as to improve control of the amplitude ratio and the out of phase condition for the jamming signal in a hostile environment. In accordance with one aspect of the invention, an EW cross-eye system comprises a receiver for receiving a radar signal and at least one polarimeter for measuring or synthesizing the received radar signal for producing a jamming signal for transmission.

In an embodiment of the invention, the EW cross-eye system comprises two antennas separated a distance, d, apart, where d is much greater than the wavelength, λ, of a tracking signal emitted by a fire control radar (i.e., d>>λ). The EW cross-eye system further comprises a receive polarimeter for measuring the tracking signal and a transmit polarimeter for synthesizing measured tracking signal to produce, for transmission, a jamming signal comprising a pair of inverted amplitude signals that are 180 degrees out of phase with each other.

DETAILED DESCRIPTION

The entire disclosure of U.S. patent application Ser. No. 10/242,268, filed Sep. 12, 2002, is expressly incorporated by reference herein.

The inventive concept is illustrated in the context of an aircraft comprising an EW cross-eye system for use in jamming a fire control radar (not shown). Other than the inventive concept, the EW cross-eye technique and circuitry for processing microwave signals are well-known and not described further herein. (For example, polarimeters, components based on monolithic microwave integrated circuits (MMICs) and stored-program control processors, e.g., a microprocessor, are well known and not described in detail herein.) In addition, the embodiments described herein are implemented using conventional programming techniques, which, as such, are not described herein.

Figure 2:
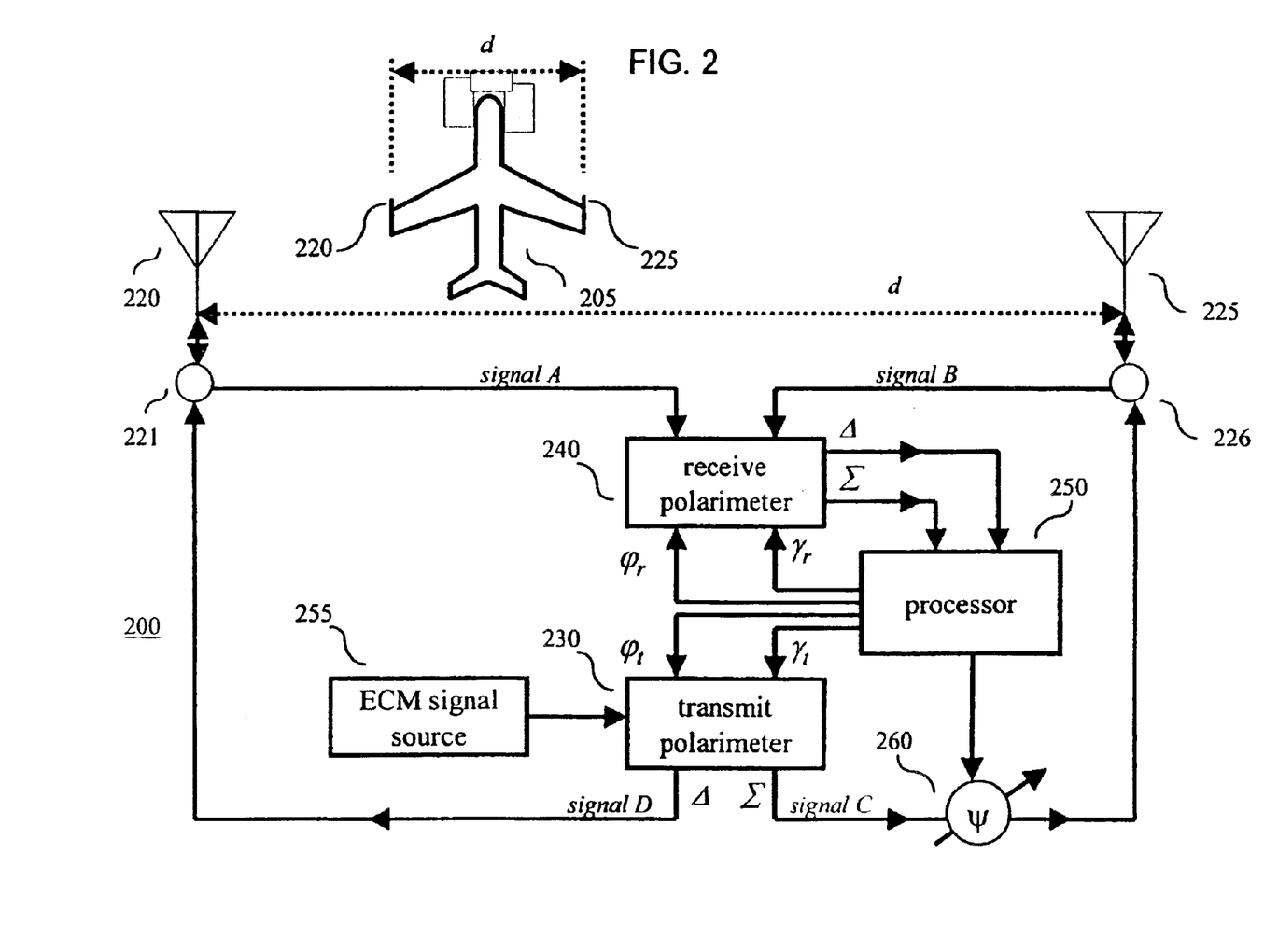
FIG. 2 shows a block diagram of an EW cross-eye system illustrating one embodiment of the invention.

Turning to FIG. 2, an illustrative cross-eye system 200 in accordance with the principles of the invention is shown. Cross-eye system 200 comprises antennas 220 and 225, circulators 221 and 226, a receive polarimeter 240, a transmit polarimeter 230, a processor 250, an electronic countermeasures (ECM) signal source 255 and an inline phase adjuster 260.

Figure 3:
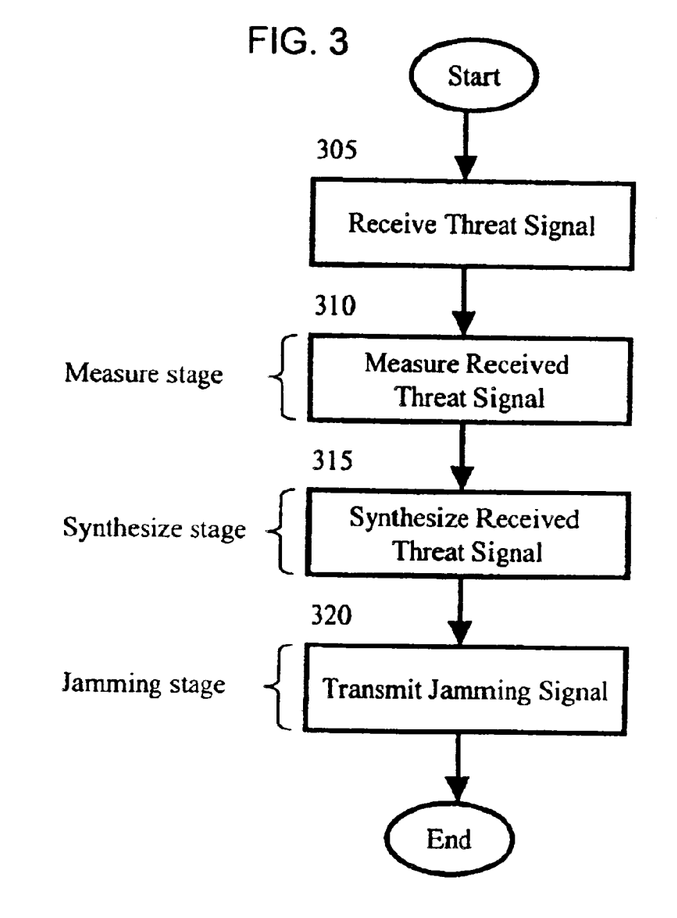
FIG. 3 shows an illustrative flow chart for use in the EW cross-eye system of FIG. 2.

The operation of cross-eye system 200 will be explained with reference FIG. 3, which illustrates a flow chart for use in accordance with the principles of the invention. The flow chart of FIG. 3 illustratively shows three stages of operation for cross-eye system 200 of FIG. 2—a measure stage 310, a match, or synthesize, stage 315, and a jamming stage 320. Each of these stages of operation is further illustrated in the context of cross-eye system 200 in FIGS. 4, 5 and 6.

In step 305, of FIG. 3, cross-eye system 200 receives a radar tracking signal, or threat signal, from a fire control radar (not shown), via antennas 220 and 225 of FIG. 2. (It is assumed that antennas 220 and 225 each transmit and receive. Alternatively, there may be separate transmit and receive antennas. In addition, it is not required that these antennas be disposed on the wings.) The components of the received threat signal, signal A and signal B, are applied to receive polarimeter 240 via circulators 221 and 226.

Before continuing further, some background on a polarimeter is provided. A conventional analog polarimeter provides four bidirectional ports—two input/output (I/O) ports, a difference ($\Delta$) port and a sum ($\Sigma$) port; along with two phase parameter ports, $\gamma$ and $\phi$, for adjusting values of two phase shifters (not shown) within the polarimeter. The output signal on the $\Sigma$ port represents the sum of the input signals applied to the I/O ports for particular $\gamma$ and $\phi$ values; while the output signal on the $\Delta$ port represents the difference of the input signals applied to the I/O ports for particular $\gamma$ and $\phi$ values. In other words, the parameters that characterize the polarization of the input signals, e.g., A and B, such as the amplitude ratio $B/A$ and the phase difference a between the signals A and B can be found from the phase shifter values $\phi$ and $\gamma$ that yield the null condition or minimum ratio $$\frac{|\Delta|}{|\Sigma|}.$$

In addition to conventional analog polarimeters, digital polarimeters are also available (although without the bi-directional nature of the ports) such as described in the following co-pending, commonly assigned, U.S. Patent Applications: "Instantaneous Measurement of Signal Polarization," application Ser. No. 09/850,371, filed May 7, 2001; and "Wideband Instantaneous Polarization Measurement," application Ser. No. 09/924,567, filed Aug. 8, 2001; both of which are incorporated by reference. A digital polarimeter makes use of a processor, memory, registers to simulate the functions found in an analog polarimeter.

Turning back to FIG. 3, the measure stage is represented by step 310 in which receive polarimeter 240 is used for measuring the amplitude and phase of the received threat signal. The receive polarimeter 240 can either be of analog or digital form. Reference can also be made at this time to FIG. 4, which shows the relevant parts of cross-eye system 200 during this stage of operation. It should be noted that in this stage of operation, transmit polarimeter 230 is disabled. As can be observed from FIG. 4, receive polarimeter 240 receives signals A and B, where signal A represents that portion of the threat signal received via antenna 220 and circulator 221, while signal B represents that portion of the threat signal received via antenna 225 and circulator 226. Receive polarimeter 240 compares the amplitude and phase of signals A and B utilizing phase parameters $\gamma_r$ and $\phi_r$, the values of which are adjusted by processor 250. (The adjustment of these parameter values can occur in any of a number of ways, e.g., holding one value constant while varying the other, etc.) In particular, processor 250 varies phase parameters $\gamma_r$ and $\phi_r$ while monitoring the signal on the $\Delta$ (difference) port of receive polarimeter 240 for a predefined value, here represented by a value of zero (or null).

Figure 4:
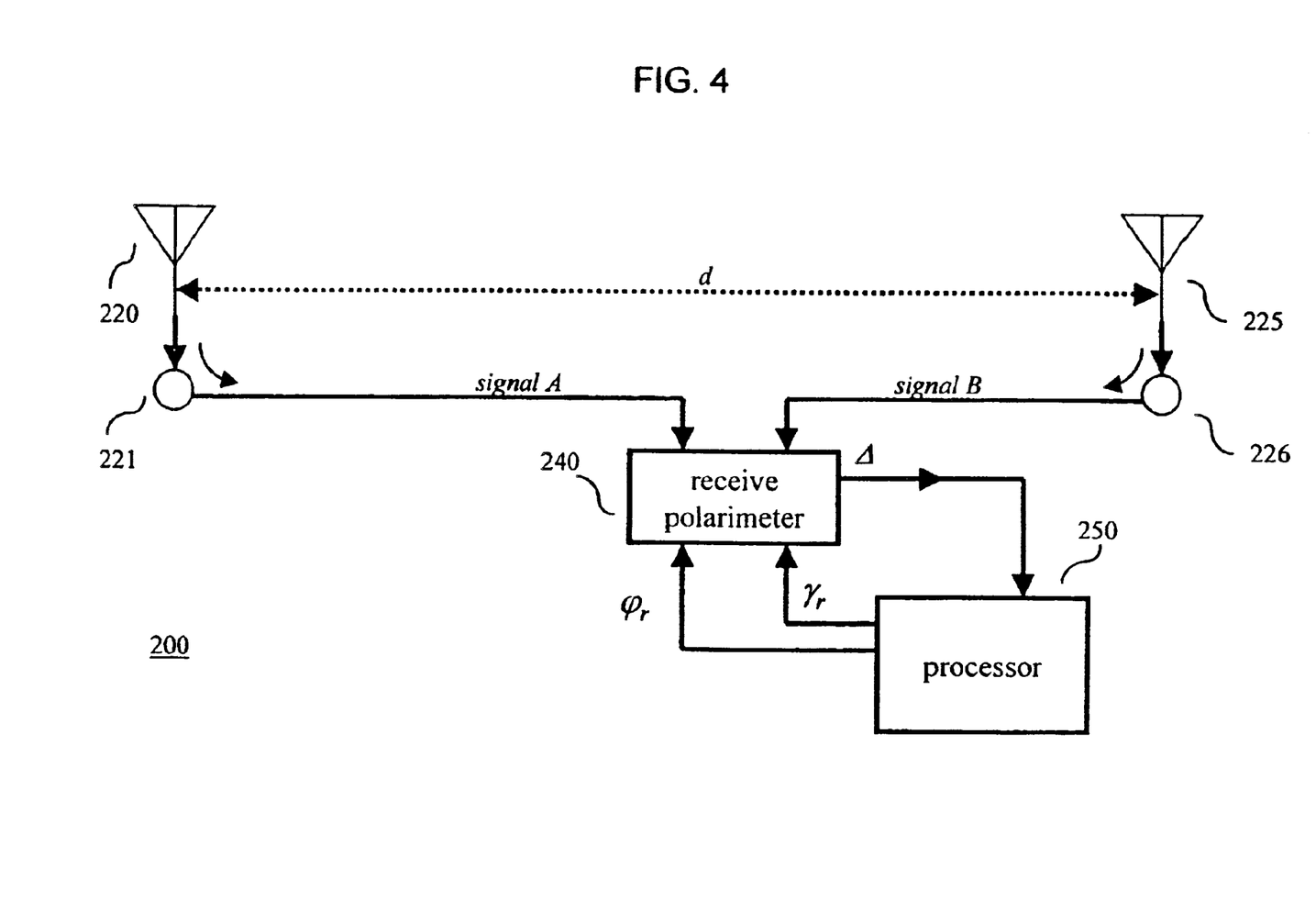
FIGS. 4–6 illustrate various stages of operation of the EW cross-eye system of FIG. 2.

When processor 250 detects that the value of the output signal on the $\Delta$ port is zero (or null), processor 250 stops adjustment of signal parameters $\gamma_r$ and $\phi_r$. In accordance with this embodiment of the invention, the particular values of signal parameters $\gamma_r$ and $\phi_r$ that result in a null being detected are referred to as $\gamma_R$ and $\phi_R$, which are representative of the measured received threat signal. Processor 250 stores the values $\gamma_R$ and $\phi_R$ in, e.g., a register (not shown). These values are also referred to as the polarimeter setting.

Figure 5:
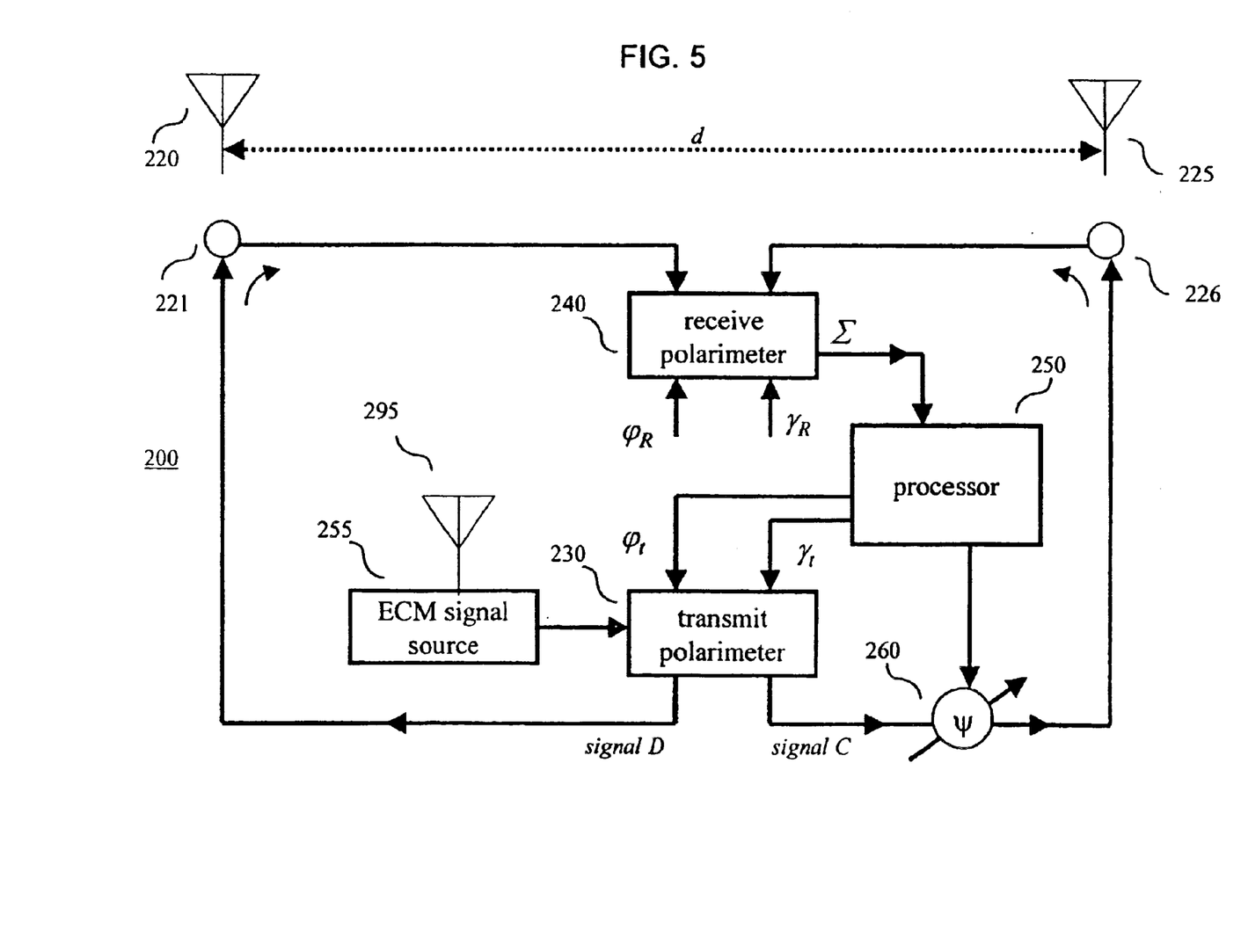

Once the received threat signal has been measured—execution proceeds to step 315, of FIG. 3, to synthesize the received threat signal. In this synthesizing stage, the measured signal properties (as represented by $\gamma_R$ and $\phi_R$) are used to synthesize (in amplitude and phase) an Electronics Countermeasures (ECM) signal (or jamming signal) for transmission back toward the fire control radar. Reference can also be made at this time to FIG. 5, which shows the relevant parts of cross-eye system 200 during this stage of operation. In particular, processor 250, of FIG. 5, sets the values (in radians) of $\gamma_t$ and $\phi_t$ of transmit polarimeter 230 such that:

$\gamma_t = \pi - \gamma_R$; and $\phi_t = (3\pi/2) - \phi_R$.

In addition, and as illustrated in FIG. 5, the values of $\gamma_r$ and $\phi_r$ for receive polarimeter 240 are fixed at $\gamma_R$ and $\phi_R$, respectively.

In this embodiment the bilateral nature of a conventional analog polarimeter can be used for generation of the jamming signal. In particular, when a signal is applied to an input port of an analog polarimeter for set values of $\gamma$ and $\phi$—two signal components are produced by the analog polarimeter on the $\Sigma$ and $\Delta$ ports, with precisely inverted amplitudes and a phase relationship between them that is 180 degrees out of phase. This is illustrated in FIG. 5, wherein an analog polarimeter—represented by transmit polarimeter 230—produces, at the $\Sigma$ and $\Delta$ ports, a jamming signal comprising components represented by signal C and signal D, respectively.

In particular, in step 315 the values of $\gamma_t$ and $\phi_t$ for transmit polarimeter 230 are set by processor 250. In addition, ECM signal source 255 generates an ECM signal (at this point serving as a test signal) for application to an input port of transmit polarimeter 230. (As known in the art, ECM signal source 255 comprises a memory (not shown) for use in storing parameter/properties (e.g., periodicity, frequency of interest) of the received threat signal for use in forming the ECM signal. As such, antenna 220 and/or antenna 225 can be used to collect this threat signal information a priori, or, as illustrated in FIG. 5, a third antenna, 295, can be used to copy this information beforehand.)

As such, ECM signal source 255 applies, in effect, a replica signal (other than in amplitude and phase) of the threat signal to the input port of transmit polarimeter 230. The latter is tasked to further modify the amplitude and phase of the ECM signal (as determined by the set values of $\gamma_t$ and $\phi_t$) to provide signal C and signal D, each signal, C and D, being a component of the jamming signal and having a phase relationship between them that is 180 degrees out of phase. As illustrated in FIG. 5, the jamming signal is fed to receive polarimeter 240, via circulators 221 and 226. (The circulators are suitably controlled as this point to block the threat signal from reaching receive polarimeter 240 and the jamming signal from being prematurely transmitted.) At this time, phase shifter 260 is initially set to a value of 0, i.e., no phase shift is added to one component—signal C—of the jamming signal.

However, typically there is a phase delay in the electromagnetic wave front reaching the two antennas 220 and 225, which causes a phase shift α. In order to provide an effective cross-eye technique, that phase shift must be compensated for. The relative phase of signals A and B is measured by the receive polarimeter 240. The value of α is derived from the measures of the polarimeter φ phase shifter setting that is an inherent attribute of the polarimeter device, i.e., $\phi_R=(3\pi/2)-\alpha$, or $\alpha=(3\pi/2)-\phi_R$. Thus, the derived value of α is negated by setting the phase shifter 260 to $\phi_R$, i.e., $\psi=\phi_R$. The phase shifter 260 must be inserted in the Σ line of the transmit polarimeter 230. With $\psi=\phi_R$, the transmit polarimeter 230 output signals are applied to the receive polarimeter. The transmit polarimeter 230 phase shifters, $\phi_t$ and $\gamma_t$, are further adjusted to obtain the deepest null possible, via processor 250. When the signal on the receive polarimeter 240 Σ port is null—the signals C and D are 180 degrees out of phase. However, a null on the receive polarimeter 240 Σ port does not provide a cross-eye condition at the radar. In order to achieve 180 degrees of phase separation between signals C and D as they meet on the radar antenna aperture, and in accordance with an aspect of the invention, phase shifter 260 must be set to a value of $\psi=2\phi_R$. The explanation is as follows. In effect, signal B travels a longer path to antenna 225 because of phase shifter 260, than the signal A does to antenna 220. Analytically, these two signals as they impinge on the ECM system antenna apertures are defined as, for antenna 225, signal B=bexpj(ωt+α), and for antenna 220, signal A=aexpj(ωt). As a response, transmit polarimeter 230 provides, at antenna 225, output signal B'=aexpj(ωt+π+α), and at antenna 220, output signal A'=bexpj(ωt). Signal B' has been imparted with a phase value of (α+π) in the polarimeter. When the signal B' reaches the radar platform, it traveled an extra distance to acquire a phase shift α. Without the compensation provided by phase shifter 260, the signals would meet on the radar aperture such that signal B'=aexpj(ωt+π+α+α) and signal A'=bexpj(ωt). This is the reason for the double phase angle compensation. Note that when $\psi=2\phi_R$, with the same input signal to the receive polarimeter, the null disappears from the Σ port output signal. To verify the system operation status, processor 250 has to reduce the ψ value by ½ to check the null depth at the Σ port output or go through a calibration step.

Ideally, at this point, the signal appearing on the Σ port of receive polarimeter 240 should be zero since the components of the jamming signal, signal C and signal D should cancel out each other. However, typically there is a phase delay in the system that must be accounted for because of the separation of the antennas. As such, to improve performance, processor 250 further adjusts the value, ψ, of phase shifter 260 until the value of the signal on the Σ port of receive polarimeter 240 is zero (null). Once the value of the signal on the Σ port of receive polarimeter 240 is null, processor 250 stops adjustment of phase shifter 260. The particular phase shift value at this point is referred to a $\psi_T$ and compensates for the system phase delay. (It should be noted that phase shifter 240 could equivalently be placed in the path to antenna 220, or multiple phase shifters in each antenna path could be used.)

Figure 6:
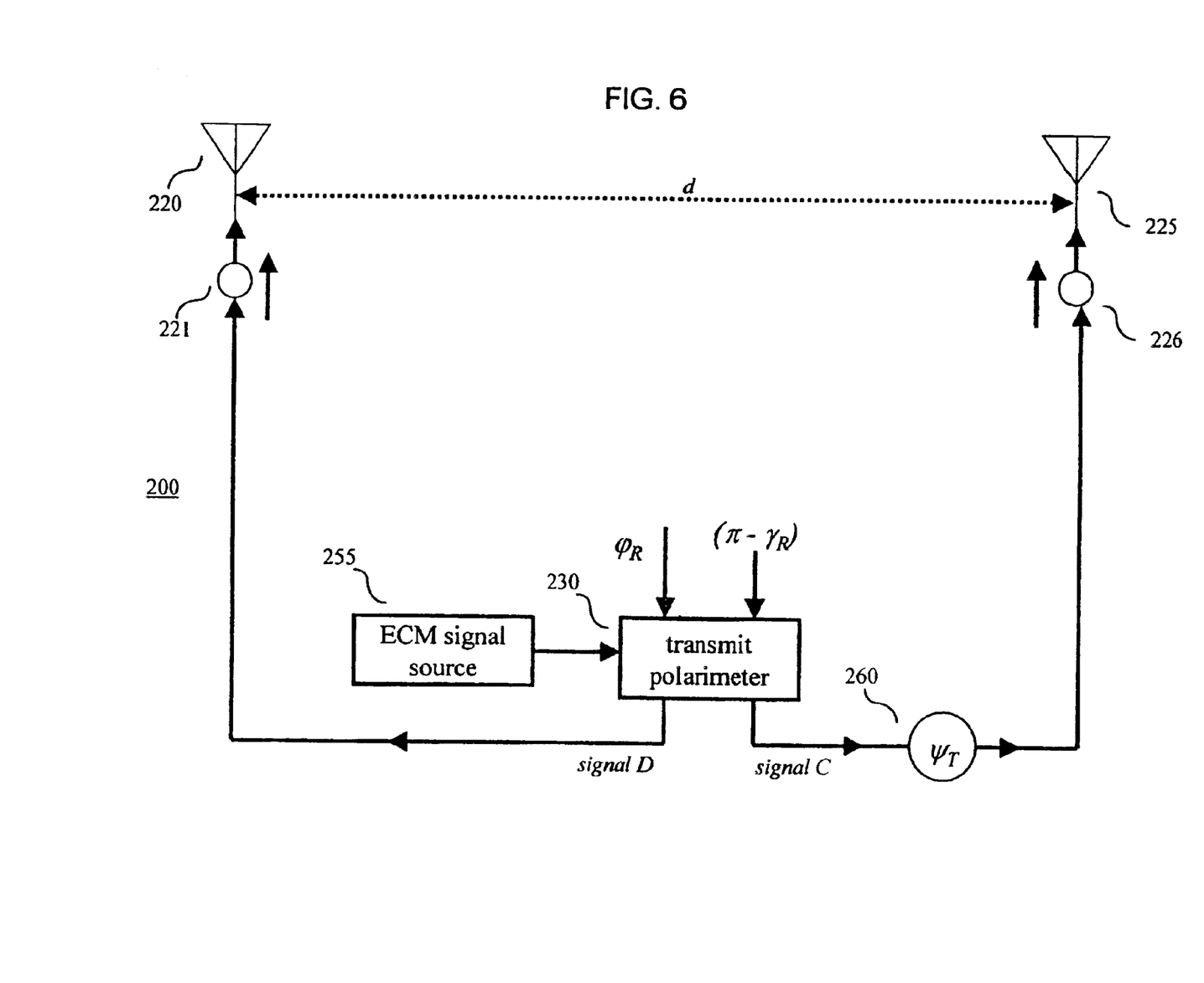

At this point, transition to the jamming stage occurs in step 320, which is also illustrated in FIG. 6. As noted above, ECM signal source 255 applies a signal to the input port of transmit polarimeter 230, which modifies the applied signal (in accordance with the set values of $\phi_R$ and $(\pi-\gamma_R)$ to generate two components, signal C and signal D, of a jamming signal. The respective components of the jamming signal are applied to antennas 220 and 225, via circulators 221 and 226. As can be observed from FIG. 6, one component (signal C) of the jamming signal is further phase shifted by phase shifter 260 before transmission.

The inventive concept makes possible an implementation of a cross-eye technique comprising a polarimeter-based approach. The system illustrated by FIG. 2 is a linear system that generates a jamming signal having inverted amplitude components 180 degrees out of phase with each other. For example, if one antenna (e.g., antenna 220) receives a threat signal component 3 dB (decibels) higher in amplitude than the threat signal component received by the other received antenna (e.g., antenna 225), the resulting jamming signal generated by transmit polarimeter 230 will have signal components 3 dB higher on the opposite antenna (in this example, antenna 225).

Figure 7:
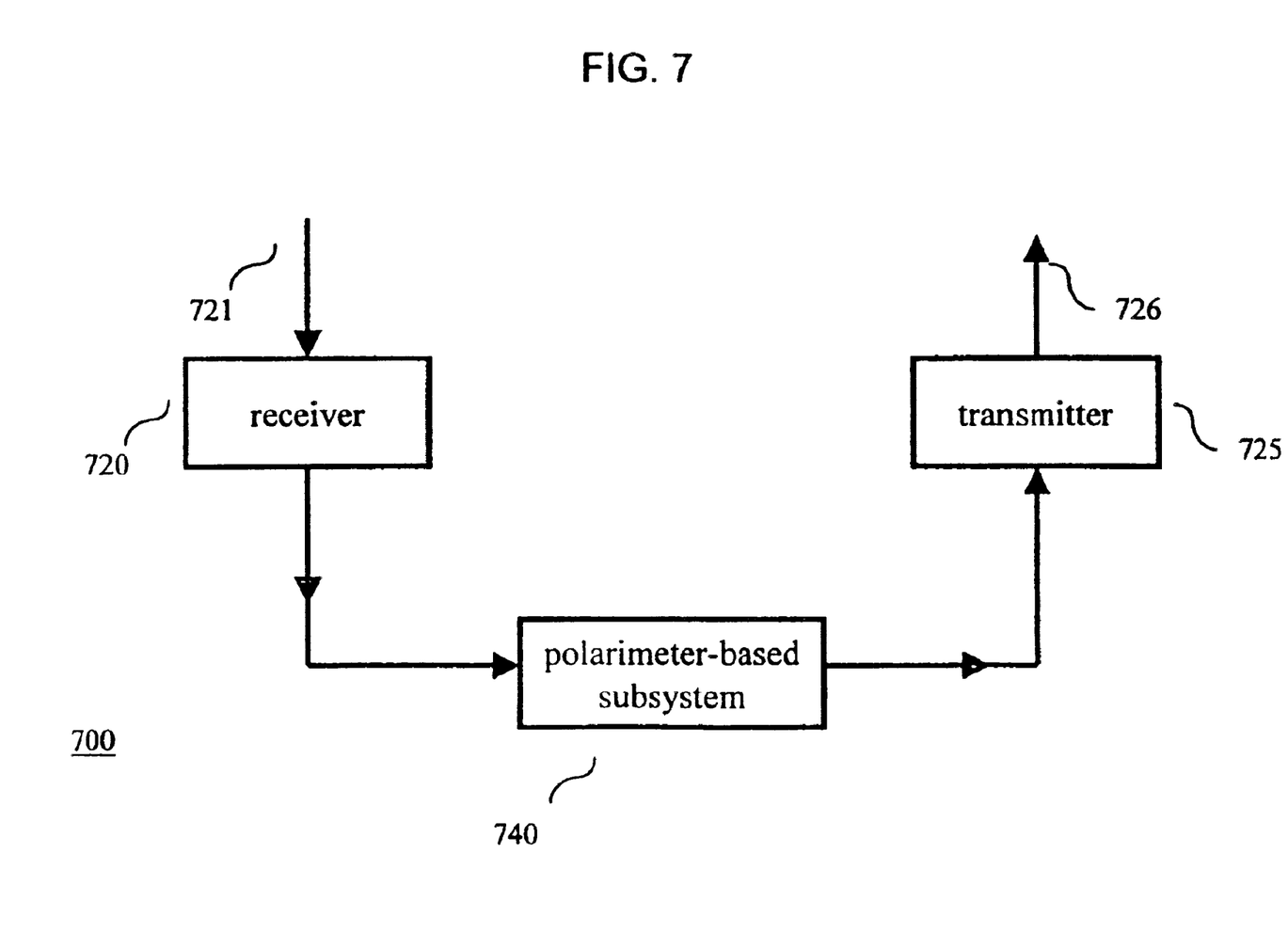
FIGS. 7–8 show other illustrative embodiments of an EW cross-eye system in accordance with the principles of the invention.

Turning now to FIG. 7, another embodiment of the invention is shown comprising receiver 720, polarimeter-based subsystem 740 and transmitter 725. The receiver 720 receives a radar tracking signal 721 from a fire control radar (not shown). The received radar tracking signal is applied to polarimeter-based subsystem 740, which comprises at least one polarimeter for use in developing, for transmission, a jamming signal 726, via transmitter 725. As described above in accordance with the flow chart of FIG. 3, polarimeter-based subsystem 740 measures and synthesizes the received tracking signal for generating the jamming signal 726.

Figure 8:
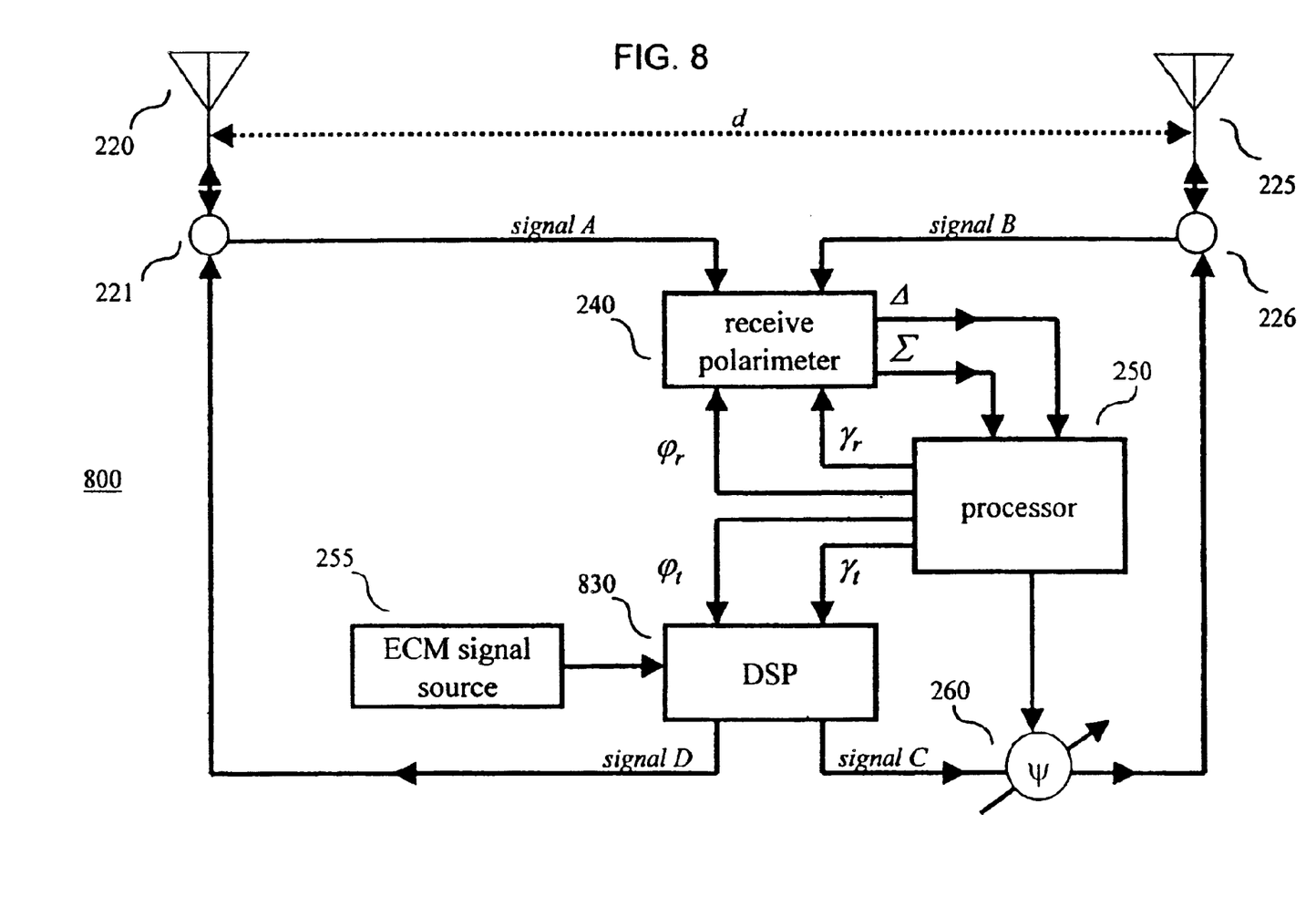

Turning now to FIG. 8, another embodiment of the invention is shown. Cross-eye system 800 of FIG. 8 is similar to cross-eye system 200 of FIG. 2 and, as such, elements with like numbers are not described further herein. As noted above, receive polarimeter 240 can be either a digital polarimeter or an analog polarimeter. In cross-eye system 800, the transmit polarimeter is emulated by digital signal processor (DSP) 830, which comprises a memory (not shown). In accordance with the flow chart of FIG. 3, once processor 250 determines the particular values of $\gamma_R$ and $\phi_R$, these values are passed to DSP 830, which is suitably programmed to emulate a polarimeter for modification of the ECM source signal as described above to synthesize the jamming signal. (Indeed, in this case phase shifter 260 may not be required and, instead, processor 250 can provide feedback on any required phase adjustment directly to DSP 830.)

It should be noted that the measure and synthesize stages of operation illustrated in FIG. 3 should be periodically, or aperiodically, repeated to ensure adequate jamming of the threat signal. Also, should the transmit power levels be of concern in the synthesizing stage, suitable attenuators can be used to cut down the amplitude of the jamming signal before application to the receive polarimeter. Finally, although not required, it is recommended that the system utilize MMIC GaAS (Gallium Arsenide) nonreciprocal polarimeters to make the above-described cross-eye system implementation more efficient.

Although the invention herein has been described with reference to particular embodiments, it is to be understood that these embodiments are merely illustrative of the principles and applications of the present invention. For example, although the invention is illustrated herein as being implemented with discrete functional building blocks, e.g., a receive polarimeter, etc., the functions of any one or more of those building blocks can be carried out using one or more appropriate programmed processors. As such, the invented technique is equally applicable to analog and digital methods of amplitude and phase measurement. In this regard, a polarimeter such as the receive polarimeter can be implemented in a suitably programmed digital signal processor or even be implemented using processor 250. In addition, it should be appreciated that the inventive concept is not limited to fixed-wing aircraft and applies to any object or vehicle, mobile or fixed, with or without wing type structures. Finally, although illustrated in the context of adjusting both phase parameters y and p of a polarimeter, the inventive concept is applicable to adjustment of only one parameter. It is therefore to be understood that numerous modifications may be made to the illustrative embodiments and that other arrangements may be devised without departing from the spirit and scope of the present invention as defined by the appended claims.

What is claimed is:

1. An electronic warfare (EW) cross-eye system, the system comprising:
   a receiver for receiving a radar signal; and
   a polarimeter-based subsystem comprising receive polarimeter for measuring the received radar signal and a transmit polarimeter for synthesizing the measured received radar signal for producing a jamming signal for transmission, the jamming signal comprising a pair of inverted amplitude signals that are 180 degrees out of phase with each other.

2. The system of claim 1 wherein the receiver comprises at least two antennas, separated from each other, for receiving the radar signal.

3. The system of claim 1 further comprising a processor for use in adjusting (a) the receive polarimeter to measure the received radar signal and (b) the transmit polarimeter for producing the jamming signal.

4. The system of claim 1 further comprising a phase adjuster for further adjusting the phase of the jamming signal.

5. Apparatus for producing a jamming signal for transmission, the apparatus comprising:
   a receive polarimeter for measuring a received radar signal for producing a polarimeter setting representative of the measured received radar signal and for measuring a phase delay associated with the apparatus;
   a transmit polarimeter, set according to the polarimeter setting, for synthesizing the measured received radar signal for producing the jamming signal comprising a pair of inverted amplitude signals that are 180 degrees out of phase with each other;
   a phase adjuster for adjusting the phase of the jamming signal before transmission to compensate for the measured phase delay; and
   a processor for controlling the receive polarimeter, the transmit polarimeter and the phase adjuster.

6. A vehicle comprising:
   at least a pair of antennas disposed on the vehicle and separated apart from each other for providing portions of a received radar signal;
   a receive polarimeter for measuring phase and amplitude relationships between the portions of the received radar signal;
   a transmit polarimeter for producing a jamming signal based upon the measured phase and amplitude relationships, the jamming signal comprising a pair of inverted amplitude signals that are 180 degrees out of phase with each other; and
   a processor for use in adjusting (a) the receive polarimeter to measure the phase and amplitude relationships and (b) the transmit polarimeter for producing the jamming signal.

7. The vehicle of claim 6 further comprising a phase adjuster for further adjusting the phase of the jamming signal before transmission.

8. The vehicle of claim 6, wherein the vehicle is an airplane comprising a pair of wings and the antennas are placed on different wings of the pair.

9. A method for use in jamming a radar signal, the method comprising the steps of:
   receiving the radar signal;
   measuring the received radar signal with a receive polarimeter;
   synthesizing the measured received radar signal with a transmit polarimeter to produce a jamming signal comprising a pair of inverted amplitude signals that are 180 degrees out of phase with each other; and
   transmitting the jamming signal.

10. The method of claim 9 wherein the receive polarimeter comprises receive phase parameter ports and a difference port, and the measuring step comprises the steps of:
    varying parameter values applied to the receive phase parameter ports until a null signal is detected on the difference port; and
    storing the parameter values associated with detection of the null signal.

11. The method of claim 10 wherein the transmit polarimeter comprises transmit phase parameter ports and a difference port, and the synthesizing step comprises the steps of:
    setting the transmit phase parameter ports to the stored parameter values; and
    generating a jamming signal from the transmit polarimeter by application of a source signal to the difference port of the transmit polarimeter.

12. The method of claim 10 wherein the receive polarimeter also comprises a sum port and the synthesizing step comprises the steps of:
    adding a phase delay to the jamming signal before transmission thereof:
    wherein the phase delay is iteratively determined by detecting when a null condition occurs on the sum port.

13. The method of claim 10 wherein the receive polarimeter also comprises a sum port, and wherein the synthesizing step comprises the steps of:
    testing the pair of inverted amplitude signals for the occurrence of a null condition on the sum port; and
    if the null condition has not occurred, iteratively adding a phase delay to at least one of the pair of inverted amplitude signals until the occurrence of the null condition.

* * * * *